United States Patent
Seseke-Koyro et al.

(10) Patent No.: US 10,562,122 B2
(45) Date of Patent: Feb. 18, 2020

(54) PROCESS FOR BRAZING OF ALUMINUM ALLOYS AND A FLUX

(71) Applicant: SOLVAY SA, Brussels (BE)

(72) Inventors: Ulrich Seseke-Koyro, Isernhagen (DE); Andreas Becker, Lachendorf (DE)

(73) Assignee: SOLVAY SA, Brussels (BE)

( * ) Notice: Subject to any disclaimer, the term of this patent is extended or adjusted under 35 U.S.C. 154(b) by 331 days.

(21) Appl. No.: 15/303,815

(22) PCT Filed: Apr. 15, 2015

(86) PCT No.: PCT/EP2015/058155
§ 371 (c)(1),
(2) Date: Oct. 13, 2016

(87) PCT Pub. No.: WO2015/158767
PCT Pub. Date: Oct. 22, 2015

(65) Prior Publication Data
US 2017/0036286 A1   Feb. 9, 2017

(30) Foreign Application Priority Data

Apr. 16, 2014 (EP) .................... 14164856

(51) Int. Cl.
| | |
|---|---|
| B23K 1/00 | (2006.01) |
| B23K 35/36 | (2006.01) |
| B23K 35/362 | (2006.01) |
| C21D 9/50 | (2006.01) |
| B23K 1/19 | (2006.01) |
| B23K 1/20 | (2006.01) |
| B23K 103/10 | (2006.01) |

(52) U.S. Cl.
CPC ............. $B23K\ 1/0012$ (2013.01); $B23K\ 1/19$ (2013.01); $B23K\ 1/203$ (2013.01); $B23K\ 35/361$ (2013.01); $B23K\ 35/362$ (2013.01); $B23K\ 35/3602$ (2013.01); $B23K\ 35/3605$ (2013.01); $C21D\ 9/50$ (2013.01); $B23K\ 2103/10$ (2018.08)

(58) Field of Classification Search
CPC .. B23K 35/286; B23K 1/203; B23K 2101/14; B23K 35/3605
See application file for complete search history.

(56) References Cited

U.S. PATENT DOCUMENTS

| | | | |
|---|---|---|---|
| 4,579,605 A | 4/1986 | Kawase et al. | |
| 2010/0170669 A1* | 7/2010 | Jaworowski | B23K 35/286 165/173 |
| 2012/0315497 A1* | 12/2012 | Becker | B23K 1/19 428/472.2 |

FOREIGN PATENT DOCUMENTS

| | | |
|---|---|---|
| EP | 0 131 444 A1 | 1/1985 |
| JP | 6-199569 A | 7/1994 |
| WO | 2007/131993 A1 | 11/2007 |
| WO | 2010/060869 A1 | 6/2010 |
| WO | 2011/110532 A1 | 9/2011 |

* cited by examiner

*Primary Examiner* — Erin B Saad

(57) ABSTRACT

A process for brazing of aluminium magnesium alloys is described applying a flux which comprises $KAlF_4$ or $CsAlF_4$ or both as major constituent. The flux further comprises at least one alkaline or alkaline earth metal compound selected from the group consisting of $KAlF_4$, $CsAlF_4$, $Li_3AlF_6$, $CaF_2$, $CaCO_3$, $MgF_2$, $MgCO_3$, $SrF_2$, $SrCO_3$, $BaF_2$, and $BaCO_3$. Preferably the flux comprises or consists of $KAlF_4$, $CsAlF_4$, and $Li_3AlF_6$ and optionally contains also $BaF_2$.

8 Claims, No Drawings

PROCESS FOR BRAZING OF ALUMINUM ALLOYS AND A FLUX

This application is a U.S. national stage entry under 35 U.S.C. § 371 of International Application No. PCT/EP2015/058155 filed Apr. 15, 2015, which claims priority to European application No. 14164856.8 filed Apr. 16, 2014. The entire contents of these applications are explicitly incorporated herein by this reference.

The present invention concerns a process for brazing of aluminum alloys containing magnesium, and a suitable flux.

It is well known in the art that brazing of aluminum parts can be performed utilizing fluxes based on alkali metal fluoroaluminates. Fluxes of this type are generally considered to be noncorrosive. For example, a flux is described in U.S. Pat. No. 4,579,605 which comprises 5% to 95% by weight of $K_2AlF_5$ or its hydrate; the remainder is $KAlF_4$. The flux may be prepared by dissolving aluminum hydroxide in hydrofluoric acid having a concentration of 5% to 40% by weight to give an Al:F ratio of 1:4 to 1:4.5 and neutralizing this mixture with potassium carbonate or hydroxide to give a Al:K ratio of 1:1-1.5.

The addition of magnesium to aluminum to form aluminum magnesium alloys improves the formability, corrosion resistance and tensile strength of parts made therefrom. On the other hand, brazing of such alloys with potassium fluoroaluminate based fluxes becomes more and more difficult with increased Mg content of the alloy. It was already known to add cesium fluoroaluminate to fluoroaluminate based fluxes to improve the brazing properties of the flux in view of aluminum magnesium alloys. See, for example, CA 1,239,525.

Japanese patent application JP-S6199569 discloses a method for brazing of aluminum using a flux which contains, on one hand, 73.6% by weight of $KAlF_4$ and 0.2 to 18.4% by weight of KF, and, on the other hand, 0.1 to 8.0% by weight, of one or more additives of the group consisting of LiF, NaF and $CaF_2$. According to the examples, the content of KF in the flux used is from 9.8 to 11% by weight.

Nevertheless, the process and the fluxes for brazing of parts made from aluminum magnesium alloys are still open for improvements.

According to one aspect, the invention relates to a process for brazing of parts of aluminum alloy comprising equal to or more than 0.5% by weight of magnesium in the interface, comprising a step of applying a brazing flux to at least one of parts to be joined, a step of assembling the parts to be joined and a step of heating the parts to be joined to a temperature of equal to or higher than 450° C. to provide brazed joint parts, wherein the brazing flux comprises equal to or more than 65% by weight, preferably equal to or more than 80% by weight, relative to the total weight of the brazing flux, of a first component and equal to or more than 3% by weight of a second component, relative to the total weight of the brazing flux, with the proviso that the first component and the second component are not identical, and wherein the first component is selected from monoalkali tetrafluoroaluminates selected from $KAlF_4$, $CsAlF_4$ and mixtures thereof, and the second component is at least one alkaline or alkaline earth metal compound selected from the group consisting of $KAlF_4$, $CsAlF_4$, $Li_3AlF_6$, $CaF_2$, $CaCO_3$, $MgF_2$, $MgCO_3$, $SrF_2$, $SrCO_3$, $BaF_2$, $BaCO_3$, and mixtures of two or more thereof; preferably with the proviso that, if at least one compound selected from the group consisting of LiF, NaF and $CaF_2$ are comprised, the content of free KF is lower than 0.1% by weight, relative to the total weight of the brazing flux.

The proviso that, if at least one compound selected from the group consisting of LiF, NaF and $CaF_2$ are comprised, the content of free KF is lower than 0.1% by weight, relative to the total weight of the brazing flux, relates to the presence of effective amounts; preferably, the proviso relates to the presence of at least one compound selected from the group consisting of LiF, NaF and $CaF_2$ if the sum of all compounds of this group is equal to or greater than 0.1% by weight, more preferably, lower than 0.05% by weight. "The term "free", e.g. in connection with free KF, denotes the binary salt, e.g. KF which is present as such, thus is not complexed, e.g. in the form of potassium fluoroaluminates. Likewise, the term "free" also denotes binary LiF, $CaF_2$ or NaF, which is not complexed. In a preferred embodiment, the content of free KF is lower than 0.1% by weight, and more preferably, lower than 0.05% by weight, relative to the total weight of the flux, in all embodiments. In a still more preferred embodiment, the sum of the content of free KF and of free or complexed NaF is lower than 0.1% by weight, more preferably, lower than 0.5% by weight, in all embodiments. In another preferred embodiment, the content of free KF is lower than 0.1% by weight, relative to the total weight of the brazing flux if at least one compound selected from the group consisting of LiF, NaF and $CaF_2$ are comprised in the flux. Generally, in this embodiment, the at least one compound selected from the group consisting of LiF, NaF and $CaF_2$ is not complexed, also denoted as free LiF, NaF or $CaF_2$.

In certain other embodiments, the sum of the content of free KF, free or complexed NaF and free LiF is lower than 0.1% by weight, more preferably, lower than 0.05% by weight, relative to the total content of the flux. In another embodiment, the flux is essentially free, and preferably, free, of LiF, NaF and $CaF_2$.

Preferably, the brazing flux comprises equal to or more than 80% by weight, relative to the total weight of the brazing flux, of CsAlF4, or, equal to or more than 80% by weight of $KAlF_4$, relative to the total weight of the brazing flux, or both $KAlF_4$ and $CsAlF_4$, the sum of which is equal to or more than 80% by weight.

The term "at the interface" is now explained. If two parts of Al or Al—Mg alloy are assembled to be brazed, the areas forming a joint are called "interface". The Mg percentage of both parts is added, and the result of the addition provides the percentage of Mg at the interface. For example, if two parts with 0.5% by weight of Mg are assembled, the content of Mg at the interface is 1% by weight. If a part comprising 1% by weight of Mg is assembled with a part containing no Mg, the Mg content at the interface is also 1% by weight.

The upper limit of the Mg content at the interface depends from the brazing conditions. For example, if flame brazing (i.e. providing heat with an open flame) is used to braze the parts, the Mg content may be up to 2% by weight at the interface, and even higher. If brazing is performed according to the Controlled Atmosphere Brazing, i.e. heat is provided by electrical installations and the rise of temperature of the parts is slower than when a flame is used, the Mg content at the interface is preferably equal to or lower than 1.5% by weight, more preferably, equal to or lower than 1.4% by weight.

The brazing temperature is dependent on the nature of the flux. If the first component is predominantly or completely constituted by $CsAlF_4$, the brazing temperature may be as low as 450° C. If the first component is predominantly or completely constituted by $KAlF_4$, the brazing temperature preferably is equal to or greater than 560° C. Here, the upper limit is often 610 to 625° C.

In a preferred embodiment, the first component consists essentially of $KAlF_4$.

Preferably, the second component is selected from the group consisting of $CsAlF_4$, $Li_3AlF_6$, $CaF_2$, $MgF_2$, $SrF_2$, $BaF_2$, and mixtures of two or more thereof.

If a Mg containing compound is present, the flux preferably contains less than 1% by weight of the sum of Mg containing compounds such as $MgF_2$ or $MgCO_3$.

More preferably, the second component is selected from the group consisting of $CsAlF_4$, $Li_3AlF_6$, $BaF_2$, and mixtures of two or more thereof. Especially preferably, the second component comprises $CsAlF_4$ and $Li_3AlF_6$, and optionally also $BaF_2$.

In certain embodiments, the sum of the content of free KF, free or complexed NaF, free LiF and $CaF_2$ is lower than 0.1% by weight, more preferably, lower than 0.05% by weight, relative to the total content of the flux.

Preferably, the second component is present in an amount of equal to or greater than 2% by weight, more preferably, in an amount of equal to or greater than 3% by weight, and often, in an amount of equal to or greater than 5% by weight.

Preferably, the second component is present in an amount of equal to or less than 30% by weight, more preferably, in an amount of equal to or less than 20% by weight. If two or more of said components mentioned above belonging to the group of second components is present, their total amount is equal to or less than 30% by weight.

If present, $CaF_2$ or $CaCO_3$ is preferably contained in an amount of equal to or more than 5% by weight. If present, $MgF_2$ or $MgCO_3$ is preferably contained in an amount of equal to or more than 5% by weight. If present, $SrF_2$ or $SrCO_3$ is preferably contained in an amount of equal to or more than 5% by weight. If present, $BaF_2$ or $BaCO_3$ is preferably contained in an amount of equal to or more than 5% by weight. If mixtures of fluorides and/or carbonates are present, then their total content is preferably equal to or more than 5% by weight.

If present, $CsAlF_4$ is preferably present in an amount of equal to or more than 1% by weight.

If present, $Li_3AlF_6$ is preferably present in an amount of equal to or greater than 1% by weight.

If present, $CaF_2$ or $CaCO_3$ is preferably contained in an amount of equal to or less than 20% by weight. If present, $MgF_2$ or $MgCO_3$ is preferably contained in an amount of equal to or less than 30% by weight. If present, $SrF_2$ or $SrCO_3$ is preferably contained in an amount of equal to or more than 30% by weight. If than 30% by weight. If mixtures of fluorides and/or carbonates are present, then the sum of their content is preferably equal to or less than 30% by weight.

If present, $CsAlF_4$ is preferably present in an amount of equal to or less than 10% by weight, more preferably, equal to or less than 5% by weight.

If present, $Li_3AlF_6$ is preferably present in an amount of equal to or less than 8% by weight.

Especially preferred ranges are: $CaF_2$ or $MgF_2$ in an amount of from 5 to 20% by weight, $SrF_2$ or $BaF_2$ in an amount of from 10 to 20% by weight; a combination of $SrF_2$ or $BaF_2$ in a total amount of from 10 to 20% by weight; $CsAlF_4$ in an amount of from 1 to 5% by weight; $Li_3AlF_6$ in an amount of from 1 to 8% by weight; $CsAlF_4$ in an amount of from 1 to 5% by weight and $Li_3AlF_6$ in an amount of from 1 to 8% by weight.

More preferably, the second component is selected from the group consisting of $CsAlF_4$, $Li_3AlF_6$, $BaF_2$, and mixtures of two or more thereof; and still more preferably, the second component is a composition consisting of $CsAlF_4$ and $Li_3AlF_6$; and optionally additionally $BaF_2$.

Highly preferred brazing fluxes are used which comprise, or consist of, $KAlF_4$ in a range of from equal to or greater than 80 to equal to or lower than 98% by weight, $CsAlF_4$ in a range of from equal to or more than 1% by weight to equal to or less than 10% by weight, $Li_3AlF_6$ in a range of from equal to or more than 1% by weight to equal to or less than 10% by weight, and $BaF_2$ in a range of from 0 to equal to or less than 15% by weight.

Preferred brazing fluxes are given in tables 1 to 4.

TABLE 1

Preferred brazing fluxes for use in Al—Mg alloy brazing

| $KAlF_4$ [% by weight] | $AEF_2$ [% by weight] | $Li_3AlF_6$ [% by weight] | $CSAlF_4$ [% by weight] |
|---|---|---|---|
| 80 | $CaF_2$ 20 | 0 | 0 |
| 80 | $MgF_2$ 20 | 0 | 0 |
| 80 | $SrF_2$ 20 | 0 | 0 |
| 80 | $BaF_2$ 20 | 0 | 0 |
| 80 | $SrF_2$ 10 $BaF_2$ 10 | 0 | 0 |
| 85 | $SrF_2$ 15 | 0 | 0 |
| 85 | $BaF_2$ 15 | 0 | 0 |
| 85 | $SrF_2$ 5 $SrF_2$ 10 | 0 | 0 |
| 82 | $CaF_2$ 15 | 0 | 3 |
| 82 | $SrF_2$ 15 | 0 | 3 |
| 82 | $MgF_2$ 15 | 0 | 3 |
| 82 | $BaF_2$ 15 | 0 | 3 |
| 82 | $SrF_2$ 7.5 $BaF_2$ 7.5 | 0 | 3 |
| 80 | $CaF_2$ 12 | 5 | 3 |
| 80 | $MgF_2$ 12 | 5 | 3 |
| 80 | $SrF_2$ 12 | 5 | 3 |
| 80 | $BaF_2$ 12 | 5 | 3 |
| 80 | $SrF_2$ 6 $BaF_2$ 6 | 5 | 3 |
| 90 | $CaF_2$ 10 | 0 | 0 |
| 90 | $MgF_2$ 10 | 0 | 0 |
| 90 | $SrF_2$ 10 | 0 | 0 |
| 90 | $BaF_2$ 10 | 0 | 0 |
| 90 | $SrF_2$ 5 $BaF_2$ 5 | 0 | 0 |
| 94 | — | 2 | 4 |
| 93 | — | 4 | 3 |
| 84 | $BaF_2$ 10 | 2 | 4 |
| 83 | $BaF_2$ 10 | 4 | 3 |

"$AEF_2$" denotes alkaline earth metal fluoride.

If desired, $KAlF_4$ can be introduced in the form of commercially available mixtures with $K_2AlF_5$ or its hydrates. Such a mixture which comprises approximately 80% by weight of $KAlF_4$ and approximately 20% by weight of $K_2AlF_5$ or its hydrates, is available from Solvay Fluor GmbH under the tradename Nocolok®. Preferred mixtures of this kind are given in table 2.

TABLE 2

Preferred brazing fluxes for use in Al—Mg alloy brazing with a mixture of $KAlF_4$ and $K_2AlF_5$ (4:1 w/w).

| $KAlF_4$/ $K_2AlF_5$ mixture [% weight] | $AEF_2$ [% weight] | $CsAlF_4$ [% weight] | $Li_3AlF_6$ [% weight] |
|---|---|---|---|
| 85 | $CaF_2$ 15 | — | — |
| 85 | $MgF_2$ 15 | — | — |
| 85 | $SrF_2$ 15 | — | — |
| 85 | $BaF_2$ 15 | — | — |

TABLE 2-continued

Preferred brazing fluxes for use in Al—Mg alloy brazing with a mixture of KAlF$_4$ and K$_2$AlF$_5$ (4:1 w/w).

| KAlF$_4$/K$_2$AlF$_5$ mixture [% weight] | AEF$_2$ [% weight] | CsAlF$_4$ [% weight] | Li$_3$AlF$_6$ [% weight] |
|---|---|---|---|
| 90 | CaF$_2$ 10 | — | — |
| 90 | SrF$_2$ 10 | — | — |
| 90 | BaF$_2$ 10 | — | — |
| 84 | BaF$_2$ 10 | 2 | 4 |
| 93 | — | 4 | 3 |
| 94 | — | 2 | 4 |
| 83 | BaF$_2$ 10 | 4 | 3 |
| 60 | KAlF$_4$ 30 BaF$_2$ 10 | — | — |

If desired, KAlF$_4$ and Li$_3$AlF$_6$ can be introduced in the form of commercially available mixtures with K$_2$AlF$_5$ or its hydrates. Such a mixture which comprises approximately 77% by weight of KAlF$_4$, approximately 19% by weight of K$_2$AlF$_5$ or its hydrates, and approximately 4% by weight of Li$_3$AlF$_6$ is available from Solvay Fluor GmbH under the tradename Nocolok®-Li. Preferred mixtures of this kind are given in table 3.

TABLE 3

Preferred brazing fluxes for use in Al—Mg alloy brazing with a mixture of KAlF$_4$, K$_2$AlF$_5$ and Li$_3$AlF$_6$ (77:19:4 w/w/w)

| KAlF$_4$/K$_2$AlF$_5$/Li$_3$AlF$_6$ mixture [% by weight] | AEF$_2$ [% by weight] | CsAlF$_4$ [% by weight] |
|---|---|---|
| 90 | CaF$_2$ 10 | — |
| 90 | MgF$_2$ 10 | — |
| 90 | SrF$_2$ 10 | — |
| 90 | BaF$_2$ 10 | — |
| 87 | CaF$_2$ 10 | 3 |
| 87 | MgF$_2$ 10 | 3 |
| 87 | SrF$_2$ 10 | 3 |
| 87 | BaF$_2$ 10 | 3 |

If desired, KAlF$_4$ and CsAlF$_4$ can be introduced in the form of commercially available mixtures with K$_2$AlF$_5$ or its hydrates. Such a mixture which comprises approximately 79% by weight of KAlF$_4$, approximately 19% by weight of K$_2$AlF$_5$ or its hydrates, and approximately 2% by weight of CsAlF$_4$ is available from Solvay Fluor GmbH under the tradename Nocolok®-Cs. Preferred mixtures of this kind are given in table 4.

TABLE 4

Preferred brazing fluxes for use in Al—Mg alloy brazing with a mixture of KAlF$_4$, K$_2$AlF$_5$ and CsAlF$_4$ (79:19:2 w/w/w)

| KAlF$_4$/K$_2$AlF$_5$/CsAlF$_4$ mixture [% by weight] | AEF$_2$ [% by weight] | Li$_3$AlF$_6$ [% by weight] |
|---|---|---|
| 90 | CaF$_2$ 10 | — |
| 90 | SrF$_2$ 10 | — |
| 90 | BaF$_2$ 10 | — |
| 87 | BaF$_2$ 10 | 3 |

According to one preferred embodiment, the first component is KAlF$_4$ in an amount of equal to or greater than 80% by weight relative to the total weight of the brazing flux, and the second component is present in an amount of equal to or greater than 5% by weight, relative to the total weight of the brazing flux, and is selected from the group consisting of CsAlF, Li$_3$AlF$_6$ and a mixture of both; additionally, CaF$_2$, MgF$_2$, SrF$_2$, BaF$_2$, and mixtures of two or more thereof may be present.

If the flux does not consist of said first and second components, the balance to 100% by weight are constituted from other fluxes known in the art, preferably, K$_2$AlF$_5$ or K$_2$AlF$_5$.H$_2$O. Preferably, the content of K$_3$AlF$_6$ is lower than 1% by weight, including 0% by weight.

It is preferred that KAlF$_4$ is essentially the only potassium fluoroaluminate in the brazing flux. The total content of K$_2$AlF$_5$, its hydrate and of K$_3$AlF$_6$, if present, is preferably equal to or lower than 5% by weight, relative to the total weight of the brazing flux.

According to one embodiment, the brazing flux consists of said first and second components.

The brazing process can be performed applying the brazing flux according to the dry fluxing method. The flux may, for example, be provided to the surface of the items to be brazed by pneumatic transport and adheres mechanically to the surface of the items to be brazed.

If the brazing flux is not applied according to the dry fluxing method, it is applied according to the wet fluxing method. In the wet fluxing method, a brazing flux composition is applied which contains the flux and additives; liquid carriers like water or alcohols are considered as additives in the present invention.

The brazing flux composition can, for example, be sprayed onto at least one of the parts to be joined, it can be painted on their surface with brushes, or it can be applied by immersing parts into liquid composition.

According to one embodiment, the brazing flux composition of the present invention is applied according to the wet fluxing method and contains the brazing flux suspended in water, water-free organic liquids or aqueous organic liquids. Preferred liquids are those that have a boiling point at ambient pressure (1 bar abs) of equal to or lower than 350° C. The term "suspended in water" does not exclude that a part of the flux composition is dissolved in the liquid; this may be the case especially when water or aqueous organic liquids are contained. Liquids that are preferred are deionized water, mono-, di- or tribasic aliphatic alcohols, especially those with 1 to 4 carbon atoms, e.g. methanol, ethanol, isopropanol, or ethylene glycol, or glycol alkyl ethers, wherein alkyl preferably denotes linear aliphatic C1 to C4 alkyl or branched C3 to C4 alkyl. Non-limiting examples are glycol monoalkyl ethers, e.g. 2-methoxyethanol or diethylene glycol, or glycol dialkyl ethers, for example, dimethyl glycol (dimethoxyethane). Mixtures comprising two or more of the liquids are also suited very well. Isopropanol or mixtures containing isopropanol are especially suitable.

In a preferred embodiment, the composition comprising the brazing flux and a liquid also contains further additives which improve the brazing flux composition properties.

In an especially preferred embodiment the brazing flux is present in the form of a flux composition wherein the flux is suspended in a liquid which also contains a binder. Binders improve, for example, the adhesion of the brazing flux after its application on the parts to be brazed. Thus, the wet flux method using a brazing flux composition comprising the brazing flux, binder and water, organic liquid or aqueous organic liquid is a preferred embodiment of the brazing process of the present invention. The liquid serves as solvent for some additives or as a carrier to disperse the flux or other insoluble components of the composition.

Suitable binders can be selected for example from the group consisting of organic polymers. These binders form a coating on aluminum parts or aluminum alloy parts when they are physically dried (i.e., they form a solid coating after the liquid is removed by evaporation), or when they are chemically dried (they form a solid coating e.g. under the influence of chemicals, e.g. oxygen or light which causes a cross linking of the molecules, or by a thermal treatment which provokes cross linking). Both mechanisms may occur simultaneously. Suitable polymers include polymers which are present in the composition in the form of a dispersion of solid particles dispersed in the liquid, and polymers which are present in the form of a solution dissolved in the liquid. Highly suitable binders are polyolefines, e.g. butyl rubbers, polyurethanes, resins, phthalates, polyacrylates, polymethacrylates, vinyl resins, epoxy resins, nitrocellulose, polyvinyl acetates or polyvinyl alcohols. Brazing flux compositions containing water as a liquid and water-soluble polymer or a polymer dispersed in water, for example, polyvinyl alcohol or polyurethane, are especially suitable because they have the advantage that, during the brazing process, water is evaporated instead of possibly flammable organic liquids.

The compositions may include other additives which improve the properties of the composition, for example, suspension stabilizers, surfactants, especially nonionic surfactants, e.g. Antarox BL 225, a mixture of linear C8 to C10 ethoxylated and propoxylated alcohols, thickeners, e.g. methyl butyl ether, thixotropic agents, e.g. gelatine or pectines, or a wax as described in EP-A 1808264.

The content of the brazing flux in the total brazing flux composition (including, for example, liquid or liquids, thixotropic agents, surfactants and binders, if present) generally is equal to or greater than 0.75% by weight. Preferably, the content of the brazing flux in the flux composition is equal to or greater than 1% by weight. More preferably, the brazing flux content in the brazing flux composition is equal to or greater than 5% by weight, very preferably, equal to or greater than 10% by weight of the total flux composition.

Generally, the brazing flux content in the brazing flux composition is equal to or lower than 70% by weight. Preferably, it is equal to or lower than 50% by weight.

The binder, if present, is generally contained in an amount of equal to or greater than 0.1% by weight, preferably equal to or greater than 1% by weight of the total brazing flux composition. The binder, if present, is generally contained in an amount equal to or lower than 30% by weight, preferably equal to or lower than 25% by weight of the total brazing flux composition.

The thixotropic agent, if present, is generally contained in an amount of equal to or greater than 1% by weight of the total brazing flux composition. Generally, if present, it is contained in an amount equal to or lower than 20% by weight, preferably in an amount equal to or lower than 10% by weight.

The thickener, if present, is generally contained in an amount of equal to or greater than 1% by weight, preferably equal to or greater than 5% by weight of the total brazing flux composition. Generally, the thickener, if present, is contained in an amount equal to or lower than 15% by weight, preferably equal to or lower than 10% by weight, of the total brazing flux composition.

Highly suitable brazing flux compositions for wet applications contain 10 to 70% by weight of the brazing flux, 1 to 25% by weight binder, 0 to 15% by weight of a thickener, 0 to 10% by weight of a thixotropic agent, and 0 to 5% by weight of other additives, e.g. a surfactant or a suspension stabilizer. Preferably, the remainder to 100% by weight is water, an organic solvent or an aqueous organic solvent; water is especially preferred.

In another embodiment, the flux composition is free of any water or water-free or aqueous organic liquid, but contains the flux (and, if desired, additives, e.g. surfactants, thickener or thixotropic agents) as described above, and a water-soluble organic polymer as a binder which is present in the form of a water soluble package for the flux. For example, polyvinyl alcohol is very suitable as water-soluble package for the flux as described in US patent application publication 2006/0231162. Such packages can be handled without dust formation, and after addition of water or aqueous organic solvents, they form a suspension of the flux in water while the water soluble polymer dissolves and provides the binder function.

The suspension can be applied in a known manner, e.g. by spraying, painting, or by dipping the parts to be joined into the suspension.

If desired, parts coated with the flux composition can be dried before brazing and then later be brazed, or drying and brazing can be performed immediately after one another.

The components can be applied separately to the parts or in the form of a premixed brazing flux.

The weight per area of the brazing flux applied on the parts to be brazed is preferably equal to or higher than 4 $g/m^2$. More preferably, it is equal to or higher than 5 $g/m^2$. Preferably, it is equal to or lower than 50 $g/m^2$, especially preferably equal to or lower than 20 $g/m^2$. If a brazing flux composition is applied, the flux load is correspondingly higher to achieve the brazing flux load as mentioned above. If, to give an example for calculation, a brazing flux composition comprising 50% by weight of the brazing flux is applied, then the load of the brazing flux composition is preferably equal to or higher than 8 $g/m^2$ to achieve a brazing flux load of equal to or higher than 4 $g/m^2$.

The heat needed for brazing the parts may be provided by an open flame, but inductive heating or heating by means of a laser is also possible. It is preferred to braze according to the Controlled Atmosphere Brazing ("CAB") process in the presence of $N_2$ or Ar gas.

Generally, a solder metal is applied. Often, solders consisting of Al and Si are applied. It is preferred to braze parts which are clad with a solder.

The process is generally performed to braze parts of Al—Mg alloys (which may contain further metals) with parts of Al—Mg alloys (which may contain further metals) or with Al parts (which may contain other metals than Mg). The content of Mg in the parts depends on the desired flux loading and of the sum of the magnesium content of the alloys at the interface of the parts to be joined. For example, if a flux loading in the upper range, e.g. from 10 to 20 $g/m^2$ is technically acceptable, an interface comprising equal to or more than 0% by weight to equal to or less then 1.8% by weight of Mg, preferably equal to or more than 0.8% by weight to equal to or less then 1.5% by weight of Mg can preferably be brazed.

If a flux loading in the lower range, e.g. from 4 to 10 $g/m^2$ is desired, an interface comprising equal to or more than 0% by weight to equal to or less then 1.0% by weight of Mg, preferably equal to or more than 0.6% by weight to equal to or less then 1.0% by weight of Mg can preferably be brazed.

The Mg content at the interface is calculated by adding the sum of Mg percentages in both parts to be joined. If, for example, two parts each with 0.68% by weight of Mg are to be joined, the Mg content at the interface is (0.68+0.68=) 1.36% by weight. If a part with 0.68% by weight of Mg and a part with 0% by weight of Mg are brazed, the Mg content at the interface is (0.68+0=) 0.68% by weight.

Brazing of parts with a Mg content in the interface in a range of from 0.6 to 1% by weight and a brazing flux load in a range of from 4 to 10 g/m$^2$ is preferred.

For example, the following kind of parts can be brazed: Heat exchangers (heater cores for oil coolers/water coolers, radiators, air conditioners and parts thereof, e.g. condensers, evaporators), sheets, thin sheets, fin to tube, endplates (used as core reinforcement) brazed to fin, headers to tube, fin to headers, tube to tube, folded tubes, extruded tubes, and fittings (e.g. nuts and bolts). Another aspect of the present invention concerns a brazing flux which may be used in the above described process for brazing of Al—Mg alloys.

The invention also relates to a brazing flux which is suitable to be used in the process of the invention mentioned above. The claimed brazing flux is a selection of the flux explained above in the description of the process of the invention.

Preferably, the brazing flux has a content of $KAlF_4$ which is equal to or greater than 80% by weight, relative to the total weight of the flux.

The brazing flux of the invention comprises, relative to the total weight of the brazing flux, equal to or more than 80% by weight of a first component selected from the group consisting of $KAlF_4$ and $CsAlF_4$, and a second component selected from the group consisting of $Li_3AlF_6$, $CaF_2$, $CaCO_3$, $MgF_2$, $MgCO_3$, $SrF_2$, $SrCO_3$, $BaF_2$, $BaCO_3$, and mixtures of two or more of said second components; or it consists of said first and second components.

Preferably, the brazing flux of the invention also is a selection in that the claimed flux mandatorily contains equal to or more than 1% by weight of $CsAlF_4$. Preferably, the flux comprises, relative to the total weight of the brazing flux, equal to or more than 80% by weight of $KAlF_4$, equal to or more than 1% by weight of $CsAlF_4$, and equal to or more than 2% by weight of at least one component selected from the group consisting of $Li_3AlF_6$, $CaF_2$, $CaCO_3$, $MgF_2$, $MgCO_3$, $SrF_2$, $SrCO_3$, $BaF_2$, $BaCO_3$, and mixtures of two or more of said second components; or it consists of said components.

More preferably, the brazing flux of the invention comprises, or consists of, relative to the total weight of the brazing flux, equal to or more than 80% by weight of $KAlF_4$, equal to or more than 1% by weight of $CsAlF_4$, and equal to or more than 3% by weight of at least one component selected from the group consisting of $Li_3AlF_6$, $CaF_2$, $CaCO_3$, $MgF_2$, $MgCO_3$, $SrF_2$, $SrCO_3$, $BaF_2$, $BaCO_3$, and mixtures of two or more of these latter components.

Preferably, the brazing flux of the invention comprises, relative to the total weight of the brazing flux, equal to or more than 80% by weight of $KAlF_4$, and equal to or more than 1% by weight of $CsAlF_4$, and equal to or more than 2% by weight of a second component selected from the group consisting of $Li_3AlF_6$, $CaF_2$, $CaCO_3$, $SrF_2$, $SrCO_3$, $BaF_2$, $BaCO_3$, and mixtures of two or more of said second components; or it consists of $KAlF_4$, $CsAlF_4$ and one or more of said second components.

If the flux does not consist of said components, the balance to 100% by weight are other flux components known in the art, preferably, $K_2AlF_5$ or $K_2AlF_5.H_2O$. Preferably, the content of $K_3AlF_6$ is lower than 1% by weight, including 0% by weight.

In certain embodiments, the sum of the content of free KF, free or complexed NaF and free LiF is lower than 0.1% by weight, more preferably, lower than 0.05% by weight, relative to the total content of the flux of the invention. In another embodiment, the flux of the invention is essentially free, and preferably, free, of LiF, NaF and $CaF_2$.

Preferably, the second component is selected from the group consisting of $Li_3AlF_6$, $CaF_2$, $MgF_2$, $SrF_2$, $BaF_2$, and mixtures of two or more of said second components.

A preferred embodiment of the brazing flux comprises or consists of, relative to the total weight of the brazing flux, equal to or more than 80% by weight of $KAlF_4$, equal to or more than 1% by weight of $CsAlF_4$; and equal to or more than 3% by weight of a second component selected from the group consisting of $Li_3AlF_6$, $CaF_2$, $MgF_2$, $SrF_2$, $BaF_2$, and mixtures of two or more of said second components.

According to one embodiment, the brazing flux consists essentially of $KAlF_4$, $CsAlF_4$, and at least one second component selected from $Li_3AlF_6$, $SrF_2$, $BaF_2$, and mixtures of 2 or more thereof. The term "essentially" in the present invention preferably denotes a content of equal to or less than 5% by weight of other salts like $K_2AlF_5$, its hydrates, and $K_3AlF_6$.

A very preferred brazing flux consists essentially of $KAlF_4$, $CsAlF_4$, $Li_3AlF_6$ and optionally includes one or more of $CaF_2$, $MgF_2$, $SrF_2$, and $BaF_2$.

A still more preferred brazing flux consists essentially of $KAlF_4$, $CsAlF_4$, and $Li_3AlF_6$, and optionally includes $BaF_2$.

Highly preferred brazing fluxes comprise, or consist of, $KAlF_4$ in a range of from equal to or greater than 80 to equal to or lower than 98% by weight, $CsAlF_4$ in a range of from equal to or more than 1% by weight to equal to or less than 10% by weight, $Li_3AlF_6$ in a range of from equal to or more than 1% by weight to equal to or less than 10% by weight, and $BaF_2$ in a range of from 0 to equal to or less than 15% by weight.

Still more preferred brazing fluxes comprise, or consist of, $KAlF_4$ in a range of from equal to or greater than 80 to equal to or lower than 98% by weight, $CsAlF_4$ in a range of from equal to or more than 1% by weight to equal to or less than 5% by weight, $Li_3AlF_6$ in a range of from equal to or more than 1% by weight to equal to or less than 8% by weight, and $BaF_2$ in a range of from 0 to equal to or less than 12% by weight.

The total content of $K_2AlF_5$ and its hydrates and of $K_3AlF_6$ in the brazing flux is preferably equal to or lower than 4% by weight, more preferably, equal to or lower than 3% by weight.

The brazing fluxes described above can be manufactured by mixing the separate components, for example, by mixing $KAlF_4$, $Li_3AlF_6$, $CsAlF_4$ and $BaF_2$, or by co-precipitation. For example, $HalF_4$ is reacted with KOH, CsOH and $Ba(OH)_2$ to provide a brazing flux comprising potassium cesium tetrafluoroaluminate and $BaF_2$. Here, the content of $K^+$ and $Cs^+$ is such that a neutral complex with $AlF_4^-$ is formed.

Still another embodiment of the present invention concerns a brazing flux composition which comprises the brazing flux as described above and at least one brazing additive. Preferred brazing additives are described above, for example, liquids, binders, suspension stabilizers, surfactants, thickeners, and thixotropic agents.

Preferred features of the brazing flux and of the brazing flux composition correspond to those features described above as being preferred embodiments of the fluxes and compositions.

Still another aspect of the present invention are coated parts of aluminum (which may contain other metals except Mg) or aluminum-magnesium alloys (which may contain other metals), coated with a flux as described above, or coated with a brazing flux composition as described above.

The brazing flux load preferably is equal to or greater than 4 g/m$^2$; preferably, the flux load is equal to or lower than 15 g/m$^2$. Parts with a flux load in the range of from 5 to 10 g/m$^2$ are especially preferred. If the brazing flux is contained in a brazing flux composition, the load of the brazing flux composition is respectively higher as explained above. Preferred coated parts are: Heat exchangers (and parts thereof, e.g. heater cores for oil coolers/water coolers, radiators, air conditioners and parts thereof, e.g. condensers, evaporators), sheets, thin sheets, fins and tubes, endplates (used as core reinforcement) to be brazed to fins, headers to be brazed to a tube, fins to be brazed to headers, tubes to be brazed to a tube, folded tubes, extruded tubes, and fittings (e.g. nuts and bolts). For example, thin Al—Mg alloy sheets (fins) with a thickness of equal to or lower than 0.1 mm down to 0.06 mm can be brazed, as well as tubes with a thickness of equal to or lower than 0.5 mm down to 0.25 mm.

Another aspect of the present invention concerns brazed parts, obtained by brazing respective parts using the inventive brazing flux, obtained by brazing coated parts according to the invention, or by brazing parts according to the process of the present invention.

The advantage of the brazing process, the brazing flux and the brazing flux composition described above is especially that they allow brazing of Al—Mg alloys with a high amount of Mg, especially with equal to or more than 0.5% by weight of Mg at the interface, and up to 2% by weight and even more.

Additionally, many of the brazing fluxes have a lower corrosion potential than known fluxes.

Should the disclosure of any patents, patent applications, and publications which are incorporated herein by reference conflict with the description of the present application to the extent that it may render a term unclear, the present description shall take precedence.

The examples which follow are intended to illustrate the present invention without, however, limiting the scope thereof.

EXAMPLES

General Remarks

Used Aluminum Parts:
a) Commercially available AMAG 6951 brazing sheet (0.68% Mg, 4343 clad) and clad-less AMAG angle material (0.68% Mg) from Austria Metal AG were used. The Mg content in the metal-to-metal interface adds up to 1.36% by weight Mg (2×0.68%) in total.
b) Commercially available AMAG 6951 brazing sheet (0.68% Mg, 4343 clad) and clad-less AMAG AA1050 (Al 99.5%) angle from Austria Metal AG were used. The Mg content in the metal-to-metal interface adds up to 0.68% by weight Mg (0.68+0%) in total.

Brazing Process:
Brazing was performed according to a standard CAB brazing profile and 25 by 25 mm clad sheet coupons (single side) with angle on top. Fluxing was done manually (flux load weight on precision scale, drops of isopropanol and homogenous spreading). Each test was performed 3 times.

Evaluation of Joints:
After brazing, the angle was removed by pulling, and the interface section was analyzed by Scanning Electron Microscopy coupled with Energy Dispersive X-ray (SEM/EDX) Spectroscopy.

Example 1

AMAG 6951 Brazing Sheet (0.68% Mg, 4343 Clad) and Clad-Less AMAG Angle Material (0.68% Mg)

The flux load in examples 1.X was always 10 g/m$^2$.

Example 1.1 (Comparison)

Brazing with Nocolok®Cs

Nocolok®Cs was used as flux. SEM/EDX showed a very thin seam with a low and in part no meniscus.

Example 1.2

Brazing with KAlF4 and BaF2

A mixture of $KAlF_4$ (90% by weight) and $BaF_2$ (10% by weight) was used as flux. SEM/EDX showed a very thin seam with a small meniscus.

Accordingly, the joint was slightly better with this flux.

Example 1.3

Brazing with KAlF4/CsAlF4/Li3AlF6

A mixture of $KAlF_4$ (94% by weight), $CsAlF_4$ (2% by weight) and $Li_3AlF_6$ (4% by weight) was used as a flux. The brazing was performed 3 times. Two times, a good brazing result was achieved.

Example 1.4

Brazing with KAlF4/CsAlF4/Li3AlF6

A mixture of $KAlF_4$ (93% by weight), $CsAlF_4$ (4% by weight) and $Li_3AlF_6$ (3% by weight) was used as a flux. The brazing was performed 3 times. The seam was thin, the meniscus was small.

Examples 2.X

The Flux Load in Examples 1.X was Always 15 g/m$^2$

Examples 1.1 to 1.4 were repeated, but with said 15 g/m$^2$ flux load.

All specimens showed a small meniscus. Examples 2.2 to 2.4 (according to the invention) always showed a better brazing result than comparison example 2.1.

Example 3

Brazing with AMAG 6951 Brazing Sheet (0.68% Mg, 4343 Clad) and Clad-Less AMAG AA1050 (Al 99.5%) Angle The flux load always was 5 g/m$^2$.

Example 3.1 (Comparison)

Brazing with Nocolok®Cs

Brazing was performed using Nocolok®Cs. After brazing, a partial thin meniscus was observed.

Example 3.2

Brazing with KAlF4, CsAlF4 and Li3AlF6 (4% by Weight)

A mixture of $KAlF_4$ (94% by weight), $CsAlF_4$ (2% by weight) and $Li_3AlF_6$ (4% by weight) was used as a flux. The brazing was performed 3 times. All three times, a well-developed meniscus was observed.

The examples above demonstrate that the fluxes according to the invention are superior to Nocolok®Cs, a flux recommended for brazing of Al—Mg alloys, and which comprises approximately 79% by weight of $KAlF_4$, approximately 19% by weight of $K_2AlF_5$ or its hydrates, and approximately 2% by weight of $CsAlF_4$.

Example 4

Flame Brazing

A brazing sheet and an angle, both from Al—Mg alloy with 0.75% by weight of Mg, clad with Al—Si12 alloy, are assembled and heated with a torch flame until flux and then the cladding melts to provide a brazed assembly.

The invention claimed is:

1. A process for brazing parts of aluminum alloy comprising equal to or more than 0.5 by weight of magnesium in the interface, the process comprising a step of applying a brazing flux to at least one of the parts to be joined, a step of assembling the parts to be joined and a step of heating the parts to be joined to a temperature of equal to or higher than 450° C. to provide brazed joint parts, wherein the brazing flux comprises equal to or more than 80% by weight, relative to the total weight of the brazing flux, of a first component and equal to or more than 3% by weight of a second component, relative to the total weight of the brazing flux, wherein the first component is a monoalkali tetrafluoroaluminate selected from the group consisting of $KAlF_4$, $CsAlF_4$ and mixtures thereof, and the second component is at least one alkaline or alkaline earth metal compound selected from the group consisting of $KAlF_4$, $CsAlF_4$, $Li_3AlF_6$, $CaF_2$, $CaCO_3$, $MgF_2$, $MgCO_3$, $SrF_2$, $SrCO_3$, $BaF_2$, $BaCO_3$, and mixtures of two or more thereof, wherein the first component and the second component are not identical, and wherein a content of free KF is lower than 0.1% by weight, relative to the total weight of the brazing flux if at least one compound selected from the group consisting of LiF, NaF and $CaF_2$ is comprised in the flux.

2. The process of claim 1 wherein the first component is $KAlF_4$.

3. The process of claim 1 wherein the second component is selected from the group consisting of $Li_3AlF_6$, $CsAlF_4$, $CaF_2$, $MgF_2$, $SrF_2$, $BaF_2$, and mixtures of two or more thereof.

4. The process of claim 1 wherein the second component is selected from the group consisting of $Li_3AlF_6$, $CsAlF_4$, $BaF_2$, and mixtures of 2 thereof, or mixtures of $Li_3AlF_6$, $CsAlF_4$ and $BaF_2$.

5. The process of claim 1 wherein the first component is $KAlF_4$ in an amount of equal to or greater than 80% by weight relative to the total weight of the brazing flux, and the second component is present in an amount of equal to or greater than 5% by weight, relative to the total weight of the brazing flux, and is selected from the group consisting of $Li_3AlF_6$, $CsAlF_4$, $BaF_2$, and mixtures of two or more thereof.

6. The process of claim 1 wherein additionally a brazing additive is applied.

7. The process of claim 1 wherein parts with a magnesium content of at least 0.6% by weight at the interface are brazed.

8. The process of claim 1 wherein parts of heat exchangers are brazed.

* * * * *